United States Patent
Wang et al.

(10) Patent No.: US 10,281,554 B2
(45) Date of Patent: May 7, 2019

(54) METHOD, DEVICE AND SYSTEM FOR TARGET TRACKING

(71) Applicant: Hangzhou Hikvision Digital Technology Co., Ltd, Zhejiang (CN)

(72) Inventors: Chao Wang, Zhejiang (CN); Xiaochen Quan, Zhejiang (CN); Ye Ren, Zhejiang (CN); Peng Wang, Zhejiang (CN); Wencong Zhang, Zhejiang (CN); Weiwei Cai, Zhejiang (CN); Shiliang Pu, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 15/556,891

(22) PCT Filed: Dec. 16, 2015

(86) PCT No.: PCT/CN2015/097637
§ 371 (c)(1),
(2) Date: Sep. 8, 2017

(87) PCT Pub. No.: WO2016/141744
PCT Pub. Date: Sep. 15, 2016

(65) Prior Publication Data
US 2018/0059207 A1    Mar. 1, 2018

(30) Foreign Application Priority Data

Mar. 9, 2015 (CN) .......................... 2015 1 0102092

(51) Int. Cl.
*G05D 1/00* (2006.01)
*G06T 7/20* (2017.01)
(Continued)

(52) U.S. Cl.
CPC ............ *G01S 3/7864* (2013.01); *G01S 19/26* (2013.01); *G05D 1/0094* (2013.01); *G06T 7/20* (2013.01);
(Continued)

(58) Field of Classification Search
CPC ...... G01S 3/7864; G01S 19/26; G01S 5/0009; G06T 7/20; G05D 1/0094; H04N 7/18
See application file for complete search history.

(56) References Cited

U.S. PATENT DOCUMENTS 6,650,360 B1 *  11/2003  Osen .................... G01S 5/0009
                                                    342/451
8,749,634 B2 *   6/2014  Taylor .................. G01S 3/7864
                                                    348/157

(Continued)

FOREIGN PATENT DOCUMENTS

CN  101924927 A  12/2010
CN  102045549 A  5/2011
(Continued)

OTHER PUBLICATIONS

International Search Report for International Patent Application No. PCT/CN2015/097637 dated Mar. 14, 2016 (English language translation attached).

(Continued)

*Primary Examiner* — Michael J Zanelli
(74) *Attorney, Agent, or Firm* — Moore & Van Allen PLLC; Henry B. Ward, III

(57) ABSTRACT

The disclosure discloses a method, device and system for target tracking. Wherein, the method for target tracking includes that: Global Positioning System (GPS) information of a target object monitored by tracking equipment is acquired (S102); Pan/Tilt/Zoom (PTZ) coordinate information corresponding to the GPS information of the target (Continued)

object is obtained according to a pre-stored conversion relationship between GPS information and PTZ coordinate information (S104); and the tracking equipment is regulated to control the tracking equipment to monitor the target object according to the PTZ coordinate information of the target object (S106). The problem of inaccuracy of a monitoring result of a method for monitoring a tracking target in the conventional art is solved.

21 Claims, 2 Drawing Sheets

(51) Int. Cl.
*H04N 7/18* (2006.01)
*G01S 19/26* (2010.01)
*G01S 3/786* (2006.01)
*H04N 5/232* (2006.01)

(52) U.S. Cl.
CPC ......... H04N 5/23299 (2018.08); H04N 7/183 (2013.01)

(56) References Cited

U.S. PATENT DOCUMENTS

| 2010/0149330 A1 | 6/2010 | Salgar et al. |
| 2012/0086825 A1 | 4/2012 | Yost et al. |
| 2012/0300079 A1* | 11/2012 | Hale ................ G01S 3/7864 348/157 |
| 2013/0162838 A1 | 6/2013 | Huang et al. |
| 2013/0162852 A1 | 6/2013 | Boyle et al. |
| 2014/0009632 A1* | 1/2014 | Glover ................ H04N 5/232 348/211.99 |
| 2014/0204230 A1* | 7/2014 | Boyle ............ H04N 5/23203 348/211.99 |
| 2015/0334311 A1* | 11/2015 | Paz ................ H04N 5/232 348/169 |
| 2016/0189391 A1* | 6/2016 | Demartin ......... G08B 13/19602 382/103 |

FOREIGN PATENT DOCUMENTS

| CN | 104081433 A | 10/2014 |
| CN | 104106260 A | 10/2014 |
| WO | 2014085987 A1 | 6/2014 |

OTHER PUBLICATIONS

Written Opinion for International Patent Application No. PCT/CN2015/097637 dated Mar. 14, 2016.

European Search Report issued by the European Patent Office dated Oct. 9, 2018, for corresponding European Patent Application No. 15884422.5.

Szwoch et al., "Visual object tracking system employing fixed and PTZ cameras," Intelligent Decision Technologies 5 (2011) 177-188; DOI 10.3233/IDT-2011-0105.

\* cited by examiner

METHOD, DEVICE AND SYSTEM FOR TARGET TRACKING

This application is filed based upon and claims priority to Chinese Patent Application of International Application No. 201510102092.9, filed on 2015 Mar. 9 and named after "a method, device and system for target tracking", the entire contents of which are incorporated herein by reference.

TECHNICAL FIELD

The embodiments of the disclosure relate to the field of video monitoring, and more particularly, to a method, device and system for target tracking.

BACKGROUND

One kind of existing target tracking technologies in the field of video monitoring, which are perform tracking according to information of a target object in an image, and this function may usually be realized by a tracking equipment. The tracking equipment captures characteristic information of the target object and performs automatic recognition and tracking, on a premise of an image recognition technology. However, such a tracking method is related to image quality is acquired and a background environment where the target object is located, and poor image quality or a complex background environment, such as occlusion, may cause loss of the target object and further cause inaccuracy of a monitoring result.

Another kind of existing target tracking technologies in the field of video monitoring, which are perform tracking according to geometric transformation, and utilize position information of a target object in a certain coordinate system, and then obtain a corresponding relationship between Pan/Tilt/Zoom (PTZ) and the coordinate system, thereby driving a dome camera for tracking, such as a box camera and dome camera tracking system, a fisheye dome camera tracking system and a double-dome camera tracking system. In the box camera and dome camera tracking system and fisheye dome camera tracking system, main video cameras may not accurately distinguish targets, so that tracking effects achieved when specific targets are tracked are poor. Double-dome tracking is also limited to a tracking effect achieved by a main dome, and may also cause inaccuracy of a monitoring result, due to existence of the condition of target loss.

For the problem of inaccuracy of a monitoring result of a method for monitoring a tracking target in a conventional art, there is no effective solution yet.

SUMMARY

A main purpose of the embodiments of the disclosure is to provide a method, device and system for target tracking, so as to solve the problem of inaccuracy of a monitoring result of a method for monitoring a tracking target in the conventional art.

In order to achieve the purpose, according to an aspect of embodiments of the disclosure, a method for target tracking is provided, and the method for target tracking according to the disclosure includes that: acquiring Global Positioning System (GPS) information of a target object monitored by tracking equipment; obtaining Pan/Tilt/Zoom (PTZ) coordinate information corresponding to the GPS information of the target object according to a pre-stored conversion relationship between GPS information and PTZ coordinate information; and regulating the tracking equipment according to the PTZ coordinate information of the target object to control the tracking equipment to monitor the target object.

In order to achieve the purpose, according to another aspect of the embodiments of the disclosure, a device for target tracking is provided, and the device for target tracking according to the disclosure includes: an acquisition module, configured to acquire GPS information of a target object monitored by tracking equipment; a conversion module, configured to obtain PTZ coordinate information corresponding to the GPS information of the target object according to a pre-stored conversion relationship between GPS information and PTZ coordinate information; and a control module, configured to regulate the tracking equipment to control the tracking equipment to monitor the target object according to the PTZ coordinate information of the target object.

In order to achieve the purpose, according to another aspect of the embodiments of the disclosure, a system for target tracking is provided, and the system for target tracking according to the disclosure includes: a GPS module, configured to acquire GPS information of a target object monitored by a tracking equipment; a processor, configured to obtain PTZ coordinate information corresponding to the GPS information of the target object according to a pre-stored conversion relationship between GPS information and PTZ coordinate information; and the tracking equipment, configured to monitor the target object according to the PTZ coordinate information of the target object.

According to the embodiments of the disclosure, the PTZ coordinate information of the target object in a monitoring range of the tracking equipment is acquired according to the GPS information of the target object, so that the technical problem of inaccuracy of a monitoring result of a method for monitoring a tracking target in the conventional art is solved, and a technical effect of continuously and accurately tracking a specific target is achieved.

BRIEF DESCRIPTION OF THE DRAWINGS

The drawings forming a part of the disclosure are adopted to provide a further understanding to the disclosure, and schematic embodiments of the disclosure and descriptions thereof are adopted to explain the disclosure and not intended to form improper limits to the disclosure. In the drawings.

DETAILED DESCRIPTION OF THE EMBODIMENTS

It is important to note that the embodiments in the disclosure and characteristics in the embodiments may be combined under the condition of no conflicts. The disclosure will be described below with reference to the drawings and the embodiments in detail.

For making the solutions of the disclosure better understood by those skilled in the art, the technical solutions in the embodiments of the disclosure will be clearly and completely described below with reference to the drawings in the embodiments of the disclosure. Obviously, the described embodiments are not all embodiments but only part of embodiments of the disclosure. All other embodiments obtained by those skilled in the art on the basis of the embodiments in the disclosure without creative work shall fall within the scope of protection of the disclosure.

It is important to note that terms "first", "second" and the like in the specification, claims and drawings of the disclosure are adopted not to describe a specific sequence or order but to distinguish similar objects. It should be understood that data used like this may be exchanged under a proper condition to facilitate descriptions made about the embodiments of the disclosure here. In addition, terms "include" and "have" and any transformation thereof are intended to cover nonexclusive inclusions. For example, a process, method, system, product or equipment including a series of steps or units is not limited to the steps or units which are clearly listed, but may include other steps or units which are not clearly listed or intrinsic to the process, the method, the product or the equipment.

Nouns involved in the disclosure will be explained as follows:

PTZ: an abbreviation of Pan/Tilt/Zoom, which represents omnidirectional movement of a tripod head of tracking equipment and zoom control over a lens of the tracking equipment, wherein P (Pan) is horizontal rotation, T (Tilt) is perpendicular rotation and Z (Zoom) is magnification.

Embodiment 1

Embodiment 1 of the disclosure provides a method for target tracking.

Figure 1:
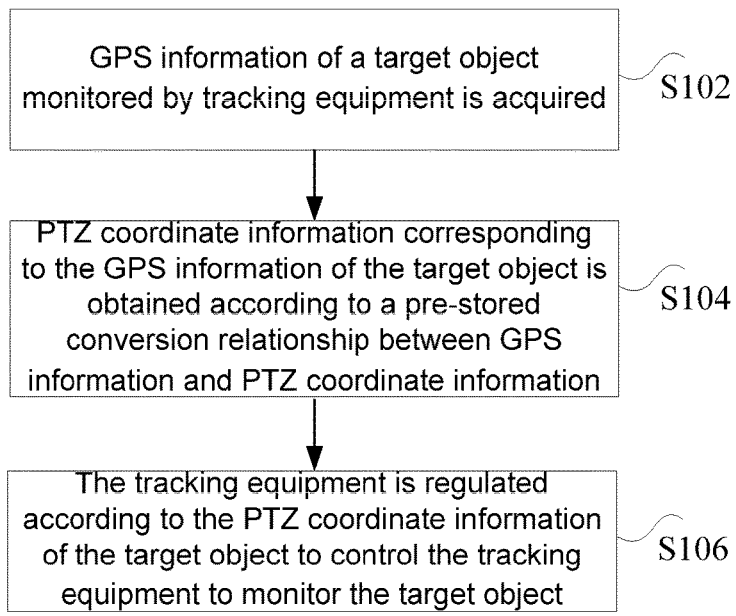
FIG. 1 is a flowchart of a method for target tracking according to embodiment 1 of the disclosure.

FIG. 1 is a flowchart of a method for target tracking according to embodiment 1 of the disclosure. As shown in FIG. 1, the method for target tracking includes the following steps.

Step S102: GPS information of a target object monitored by tracking equipment is acquired.

Specifically, in Step S102, the tracking equipment may be any one of tracking equipment which may be controlled by a PTZ parameter, and the tracking equipment usually includes a tripod head or an interface connected with the tripod head. The target object carries a GPS module, and the GPS information of the module may be acquired in real time. The GPS information is information received through the GPS module, and data, received by the GPS module, in a fixed format may be extracted to acquire latitude data and longitude data of the target object, wherein the latitude data may be northern latitude data of the latitude hemisphere N, i.e. the northern hemisphere, or southern latitude data of the latitude hemisphere S, i.e. the southern hemisphere, and the longitude data may be eastern longitude data of the longitude hemisphere E, i.e. the eastern hemisphere, or western longitude data of the longitude hemisphere W, i.e. the western hemisphere. A tracking target is positioned within a monitoring range of the tracking equipment. The tracking equipment alternatively includes a dome camera, a PTZ video camera and the like.

Step S104: PTZ coordinate information corresponding to the GPS information of the target object is obtained according to a pre-stored conversion relationship between GPS information and PTZ coordinate information.

Specifically, in Step S104, the PTZ coordinate information is a PTZ parameter of the tripod head of the tracking equipment when the tracking equipment locks the target object at a certain fixed position in a visual field of the lens. Alternatively, the PTZ coordinate information is a PTZ parameter of the tripod head of the tracking equipment when the tracking equipment locks the target object at a central position of the visual field of the lens. The pre-stored conversion relationship between the GPS information and the PTZ coordinate information is a mutual conversion relationship between GPS information and PTZ coordinate information of any point in a visual range of the tracking equipment, and after the conversion relationship is determined, GPS information of a certain position of the target object and PTZ coordinate information of the position are uniquely determined and correspond to each other. Therefore, GPS information of any point in a movement path of the target object may be obtained to obtain PTZ coordinate information of the target object at the point.

Step S106: the tracking equipment is regulated according to the PTZ coordinate information of the target object to control the tracking equipment to monitor the target object.

Specifically, in Step S106, after the PTZ coordinate information corresponding to the GPS information of the target object is obtained, the tripod head of the tracking equipment regulates a monitoring visual angle and monitoring ratio of the tracking equipment to lock the target object according to the PTZ coordinate information.

By Steps S102 to S106, continuous tracking of the target object is implemented by acquiring the PTZ coordinate information of the target object in the monitoring range of the tracking equipment according to the GPS information of the target object, so that the technical problem of target loss possibly appearing when a target is tracked in the conventional art is solved, and a technical effect of continuously tracking a specific target is achieved.

Preferably, before Step S104, the method further includes:

Step S103: the conversion relationship between the GPS information and the PTZ coordinate information is stored, wherein the conversion relationship includes: a first conversion relationship between the GPS information and ground coordinate information, a second conversion relationship between the ground coordinate information and tracking equipment coordinate information and a third conversion relationship between the PTZ coordinate information and the tracking equipment coordinate information.

Specifically, in Step S103, the ground coordinate information is a coordinate value in a first two-dimensional rectangular coordinate system, and the first two-dimensional rectangular coordinate system adopts any point on a ground-based plane as a coordinate origin. The tracking equipment coordinate information is a coordinate value in a second two-dimensional rectangular coordinate system, and the second two-dimensional rectangular coordinate system adopts an upright tube of the tracking equipment as a coordinate origin. The tracking equipment coordinate information is unrelated to a specific geographical position of the tracking equipment, and is configured to represent the coordinate information of the target object in the second two-dimensional rectangular coordinate system established on the basis of the tracking equipment, wherein the first two-dimensional rectangular coordinate system and the second two-dimensional rectangular coordinate system are both two-dimensional rectangular coordinate systems parallel to the ground.

Preferably, the operation that the PTZ coordinate information corresponding to the GPS information of the target object is obtained according to the pre-stored conversion relationship between the GPS information and the PTZ coordinate information in Step S104 specifically includes the following steps.

Step S202: the currently acquired GPS information of the target object is converted into ground coordinate information corresponding to the target object according to the first conversion relationship.

Specifically, in Step S202, the first conversion relationship is a conversion relationship between the GPS information and the ground coordinate information, the GPS information is specific longitude and latitude data, and the ground coordinate information is a coordinate in the first two-dimensional rectangular coordinate system. The first conversion relationship is a two-way conversion relationship, GPS longitude and latitude data of a certain point may be converted into a coordinate value of the point in the first two-dimensional rectangular coordinate system, and a coordinate value of a certain point in the first two-dimensional rectangular coordinate system may also be converted into GPS longitude and latitude data of the point.

Step S204: the ground coordinate information, obtained by conversion, corresponding to the target object is converted into tracking equipment coordinate information corresponding to the target object according to the second conversion relationship.

Specifically, in Step S204, the second conversion relationship is a conversion relationship between the ground coordinate information and the tracking equipment coordinate information. The ground coordinate information is a coordinate in the first two-dimensional rectangular coordinate system, the tracking equipment coordinate information is a coordinate in the second rectangular coordinate system, and the two rectangular coordinate systems are ensured to meet a conversion relationship of linear direct transformation, that is, one rectangular coordinate system is converted into the other rectangular coordinate system by certain translation, rotation and scaling. The second conversion relationship is a two-way conversion relationship, a coordinate value of a certain point in the first two-dimensional rectangular coordinate system may be converted into a coordinate value of the point in the second two-dimensional rectangular coordinate system, and a coordinate value of a certain point in the second two-dimensional rectangular coordinate system may also be converted into a coordinate value of the point in the first two-dimensional rectangular coordinate system.

Step S206: the tracking equipment coordinate information, obtained by conversion, corresponding to the target object is converted into the PTZ coordinate information corresponding to the target object according to the third conversion relationship.

Specifically, in Step S206, the third conversion relationship is a conversion relationship between the tracking equipment coordinate information and the PTZ coordinate information. The tracking equipment coordinate information is a coordinate in the second rectangular coordinate system, and PTZ coordinate information of the tracking equipment is a PTZ parameter of the tripod head when the tracking equipment monitors the target object. The third conversion relationship is a two-way conversion relationship, a coordinate value of a certain point in the second two-dimensional rectangular coordinate system may be converted into a PTZ parameter of the tripod head when the tracking equipment locks the point, and the PTZ parameter of the tripod head when the tracking equipment locks the point may also be converted into the coordinate value of the point in the second two-dimensional rectangular coordinate system.

Preferably, before the operation that the conversion relationship between the GPS information and the PTZ coordinate information is stored in Step S103, the method further includes the following steps.

Step S302: the first conversion relationship between the GPS information and the ground coordinate information is acquired.

Step S304: the third conversion relationship between the PTZ coordinate information and the tracking equipment coordinate information is acquired.

Step S306: the second conversion relationship between the ground coordinate information and the tracking equipment coordinate information is acquired.

Preferably, the operation that the first conversion relationship between the GPS information and the ground coordinate information is acquired in Step S302 specifically includes the following steps.

Step S3022: a first two-dimensional rectangular coordinate system is established, wherein abscissa and ordinate axes of the first two-dimensional rectangular coordinate system point to any two directions in due east, due west, due south and due north respectively.

Specifically, in Step S3022, the abscissa and ordinate axes of the first two-dimensional rectangular coordinate system may be freely selected. The coordinate origin of the first two-dimensional rectangular coordinate system is any position. The abscissa and ordinate axes of the first two-dimensional rectangular coordinate system must be perpendicular, the directions to which the abscissa and ordinate axes point respectively must be two directions clockwise or counterclockwise at a difference of 90° in due east, due west, due south and due north, and there is no possibility of appearance of the condition that, for example, the abscissa and ordinate axes of the first two-dimensional rectangular coordinate system are due east and due west respectively.

Step S3024: GPS information of a coordinate origin of the first two-dimensional rectangular coordinate system is read, and GPS information of a monitoring point in a monitoring picture of the tracking equipment is read, the GPS information including: latitude data and longitude data.

Specifically, in Step S3024, the GPS information of the selected monitoring point and the coordinate origin of the first two-dimensional rectangular coordinate system is acquired by virtue of the GPS module. Along with different geographical positions of the earth, possible combinations of the latitude data and longitude data included in the GPS information are: northern latitude data+eastern longitude data, northern latitude data+western longitude data, southern latitude data+eastern longitude data and southern latitude data+western longitude data.

Preferably, in Step S3024, GPS information of at least two monitoring points in the monitoring picture of the tracking equipment is acquired, the first two-dimensional rectangular coordinate system is established by taking one monitoring point as the coordinate origin, and the GPS information of the coordinate origin is equivalently acquired. When the first two-dimensional rectangular coordinate system is established, a position represented by certain determined longitude data and latitude data is specified as the coordinate origin of the first two-dimensional rectangular coordinate system, which is also equivalent to acquisition of the GPS information of the coordinate origin.

Step S3026: a corresponding relationship between the GPS information of the monitoring point and a coordinate value of the monitoring point in the first two-dimensional rectangular coordinate system is created to acquire the first conversion relationship.

Specifically, in Step 3026, a specific calculation relationship between the GPS information of the monitoring point and the coordinate value of the monitoring point in the first two-dimensional rectangular coordinate system includes that: a longitude distance difference and latitude distance difference between the monitoring point and the coordinate origin may be obtained according to the read GPS information of the monitoring point and GPS information of the coordinate origin; the longitude distance difference and the latitude distance difference correspond to abscissa and ordinate values of the monitoring point in the first two-dimensional rectangular coordinate system, wherein the latitude distance difference corresponds to a coordinate value on the coordinate axis pointing to due south or due north, and the longitude distance difference corresponds to a coordinate value on the coordinate axis pointing to due wet or due east.

Specifically, in Step S3026, the first conversion relationship is configured to represent a corresponding relationship between a latitude data difference value and an abscissa value, a longitude data difference value and a ordinate value, wherein the latitude data difference and the longitude data difference value are data difference values between the monitoring point and the coordinate origin, and the abscissa value and the ordinate value are coordinate values of the monitoring point in the first two-dimensional rectangular coordinate system.

Alternatively, the latitude distance difference is equal to the coordinate value of the monitoring point on the coordinate axis pointing to due south or due north in the first two-dimensional rectangular coordinate system, and the longitude distance difference is equal to the coordinate value of the monitoring point on the coordinate axis pointing to due west or due east in the first two-dimensional rectangular coordinate system.

Alternatively, a product of the latitude distance difference and a first proportionality coefficient is equal to the coordinate value of the monitoring point on the coordinate axis pointing to due south or due north in the first two-dimensional rectangular coordinate system, and a product of the longitude distance difference and the first proportionality coefficient is equal to the coordinate value of the monitoring point on the coordinate axis pointing to due west or due east in the first two-dimensional rectangular coordinate system, wherein the first proportionality coefficient is a non-zero real number. The first proportionality coefficient is configured to properly reduce or enlarge the longitude distance difference and the latitude distance difference.

To sum up, Step S3022 to Step S3026 included in Step S302 are mainly adopted to calculate the first conversion relationship between the GPS information and the ground coordinate information. When a conversion relationship between GPS information and a PTZ coordinate or the first conversion relationship exists, Step S302 is not a necessary step of the method for target tracking provided by embodiment 1 of the disclosure.

Preferably, the corresponding relationship between the GPS information of the monitoring point and the coordinate value of the monitoring point in the first two-dimensional rectangular coordinate system is calculated according to the following formula:

$$P_T = (P_{Tx}, P_{Ty}) = ((N_T, N_0), (E_0, E_T), \times \cos(N_0/180 \times \pi)),$$

where $P_T$ is the coordinate value of the monitoring point in the first two-dimensional rectangular coordinate system, $P_{Tx}$ is the abscissa value of the monitoring point in the first two-dimensional rectangular coordinate system, and $P_{Ty}$ is the ordinate value of the monitoring point in the first two-dimensional rectangular coordinate system, $N_0$ is the latitude data in the GPS information of the coordinate origin, and $E_0$ is the longitude data in the GPS information of the coordinate origin, and $N_T$ is the latitude data in the GPS information of the monitoring point, and $E_T$ is the longitude data in the GPS information of the monitoring point.

Preferably, the operation that the third conversion relationship between the PTZ coordinate information and the tracking equipment coordinate information is calculated in Step S304 specifically includes the following steps.

Step S3042: a second two-dimensional rectangular coordinate system is established, wherein directions of abscissa and ordinate axes of the second two-dimensional rectangular coordinate system is a direction, to which the tracking equipment points when a horizontal rotation angle difference of the tracking equipment is 90° respectively.

Specifically, in Step S3042, the directions to which the abscissa and ordinate axes of the second two-dimensional rectangular coordinate system point is a direction, to which an image center of the tracking equipment points when the horizontal rotation angle difference, i.e. a P parameter, of the tracking equipment is 90° respectively. For example, when the abscissa axis of the second two-dimensional rectangular coordinate system points to a direction to which the image center points when the P parameter is 45°, the ordinate axis of the second two-dimensional rectangular coordinate system is a direction to which the image center points when the P parameter is 135°.

Step S3044: PTZ coordinate information of the monitoring point in the picture of the tracking equipment is read.

Alternatively, the PTZ coordinate information of the monitoring point is the PTZ parameter of the tripod head of the tracking equipment when the tracking equipment locks the selected monitoring point at a fixed position of the monitoring picture. Preferably, the fixed position is a center of the monitoring picture. Therefore, a certain specific monitoring point in the monitoring picture of the tracking equipment is ensured to have unique PTZ coordinate information.

Step S3046: a corresponding relationship between the PTZ coordinate information of the monitoring point and a coordinate value of the monitoring point in the second two-dimensional rectangular coordinate system is created, so as to acquire the third conversion relationship.

Specifically, in Step S3046, the PTZ coordinate information of the monitoring point and the coordinate value of the monitoring point in the second two-dimensional rectangular coordinate system correspond one to one.

Specifically, in Step S3046, a specific calculation relationship between the PTZ coordinate information of the monitoring point and the coordinate value of the monitoring point in the second two-dimensional rectangular coordinate system includes that: a length of a projection of a connecting line of the tracking equipment and the monitoring point on a plane of the second two-dimensional rectangular coordinate system is calculated according to a T parameter in the PTZ coordinate information; and coordinate components of the projection of the connecting line on the plane of the second two-dimensional rectangular coordinate system on the abscissa and ordinate axes of the second two-dimensional rectangular coordinate system are calculated to obtain coordinates of the monitoring point in the second two-dimensional rectangular coordinate system according to the P parameter in the PTZ coordinate information.

Alternatively, the third conversion relationship is configured to represent a corresponding relationship between the coordinate components of the projection of the connecting line of the monitoring point and the tracking equipment on the coordinate axes of the second two-dimensional rectangular coordinate system and the coordinate value of the monitoring point in the second two-dimensional rectangular coordinate system.

Alternatively, the coordinate components of the projection of the connecting line on the abscissa and ordinate axes of the second two-dimensional coordinate system are equal to the coordinate value of the monitoring point in the second two-dimensional rectangular coordinate system.

Alternatively, a product of the coordinate components of the projection of the connecting line on the abscissa and ordinate axes of the second two-dimensional coordinate system and a second proportionality coefficient is equal to the coordinate value of the monitoring point in the second two-dimensional rectangular coordinate system, wherein the second proportionality coefficient is a non-zero real number.

To sum up, Step S3042 to Step S3046 included in Step S304 are mainly adopted to calculate the third conversion relationship between the PTZ coordinate information and the tracking equipment coordinate information. When the conversion relationship between the GPS information and the PTZ coordinate or the third conversion relationship exists, Step S304 is not a necessary step of the method for target tracking provided by embodiment 1 of the disclosure.

Preferably, the corresponding relationship between the PTZ coordinate information of the monitoring point and the coordinate value of the monitoring point in the second two-dimensional rectangular coordinate system is calculated according to the following formula:

$$Q_T = (Q_{Tx}, Q_{Ty}) = (1/\tan(\varphi_T/180 \times \pi) \times \sin((\theta_T - \theta_y)/180 \times \pi),$$

$$1/\tan(\varphi_T/180 \times \pi) \times \cos((\theta_T - \theta_y)/180 \times \pi)),$$

where $Q_T$ is the coordinate value of the monitoring point in the second two-dimensional rectangular coordinate system, $Q_{Tx}$ is an abscissa value of the monitoring point in the second two-dimensional rectangular coordinate system, and $Q_{Ty}$ is an ordinate value of the monitoring point in the second two-dimensional rectangular coordinate system, $\theta_T$ is a P parameter of the monitoring point, $\theta_y$ is a horizontal rotation angle of the tracking equipment when the tracking equipment points to the vertical axis of the second two-dimensional rectangular coordinate system, and $\varphi_T$ is a T parameter of the monitoring point.

Preferably, under the condition that the abscissa and ordinate axes of the second two-dimensional rectangular coordinate system point to directions to which the tracking equipment point when a horizontal rotation angle of the tracking equipment is 90° and directions to which the tracking equipment point when the horizontal rotation angle of the tracking equipment is 0°, the corresponding relationship between the PTZ coordinate information of the monitoring point and the coordinate value of the monitoring point in the second two-dimensional rectangular coordinate system is calculated according to the following formula:

$$Q_T = (Q_{Tx}, Q_{Ty}) = (1/\tan(\phi_T/180 \times \pi) \times \sin(\theta_T/180 \times \pi), 1/\tan(\phi_T/180 \times \pi) \times \cos(\theta_T/180 \times \pi)),$$

where $Q_T$ is the coordinate value of the monitoring point in the second two-dimensional rectangular coordinate system, $Q_{Tx}$ is an abscissa value of the monitoring point in the second two-dimensional rectangular coordinate system, and $Q_{Ty}$ is an ordinate value of the monitoring point in the second two-dimensional rectangular coordinate system, $\theta_T$ is the P parameter of the monitoring point, and $\phi_T$ is the T parameter of the monitoring point.

Preferably, the operation that the second conversion relationship between the ground coordinate information and the tracking equipment coordinate information is acquired in Step S306 includes the following steps:

Step S3062: ground coordinate information of at least two monitoring points in a picture of the tracking equipment in the first two-dimensional rectangular coordinate system is read.

Specifically, acquisition of the second conversion relationship between the ground coordinate information and the tracking equipment coordinate information may be converted into acquisition of a conversion parameter between the first two-dimensional rectangular coordinate system and the second two-dimensional rectangular coordinate system. The two coordinate systems meet linear direct transformation, that is, one coordinate system may be converted into the other coordinate system by certain translation, rotation and scaling, so that total coordinate values of at least two known points in the two coordinate systems are required to acquire a rotation coefficient, translation coefficient and scaling coefficient between the two coordinate systems.

Specifically, in Step S3062, at least two monitoring points are selected, GPS information of the at least two monitoring points is acquired, and ground coordinate information of the at least two monitoring points is obtained according to the first conversion relationship.

Step S3064: tracking equipment coordinate information of the at least two monitoring points in the second two-dimensional rectangular coordinate system is read.

Specifically, in Step S3064, PTZ coordinate information of the at least two monitoring points is acquired, and the tracking equipment coordinate information of the at least two monitoring points is obtained according to the third conversion relationship.

Step S3066: a corresponding relationship between a coordinate value in the first two-dimensional rectangular coordinate system and a coordinate value in the second two-dimensional rectangular coordinate system is created to acquire the second conversion relationship, wherein the second conversion relationship is configured to represent a corresponding relationship between a coordinate value of a monitoring point in the first two-dimensional rectangular coordinate system and a coordinate value of the same monitoring point in the second two-dimensional rectangular coordinate system.

Specifically, in Step S3066, two groups of one-to-one corresponding relationships between coordinate values in the first two-dimensional rectangular coordinate system and coordinate values in the second two-dimensional rectangular coordinate system may be established on the basis of the ground coordinate information of the at least two monitoring points in the first two-dimensional rectangular coordinate system and the tracking equipment coordinate information in the second two-dimensional rectangular coordinate system, and the scaling coefficient, rotation coefficient and translation coefficient used when the second conversion relationship is calculated may be acquired through the two groups of one-to-one corresponding relationships.

Preferably, the operation that the corresponding relationship between the coordinate value in the first two-dimensional rectangular coordinate system and the coordinate value in the second two-dimensional rectangular coordinate system is created to acquire the second conversion relationship in Step S3066 specifically includes the following calculation steps:

Step S30662: a first column vector and second column vector based on each monitoring point are established according to the coordinate values of the monitoring point in the at least two monitoring points in the first two-dimensional rectangular coordinate system and the second two-dimensional rectangular coordinate system respectively.

Specifically, in Step S30662, a first column vector is established by a coordinate value of a certain point in the first two-dimensional rectangular coordinate system, wherein elements of the first column vector may sequentially be an abscissa value and a ordinate value, and may also be the ordinate value and the abscissa value. A second column vector is established by a coordinate value of the same point in the second two-dimensional rectangular coordinate system, a sequence of elements in the second column vector is the same as the first column vector, and the first column vector and second column vector based on the same point also form a one-to-one corresponding relationship.

Step S30664: a corresponding relationship between the first column vector and the second column vector is created, wherein the corresponding relationship includes that: a result obtained by multiplying the first column vector by a scaling transformation coefficient, premultiplying of a multiplication result by a rotation transformation matrix and adding a translation transformation vector to a premultiplication result is equal to the second column vector, or, a result obtained by multiplying the second column vector by the scaling transformation coefficient, premultiplying a multiplication result by the rotation transformation matrix and adding translation transformation vector to a premultiplication result is equal to the first column vector.

Specifically, in Step S30664, there exists scaling, rotation and translation transformation between the first column vector established on the basis of the coordinate values in the first coordinate system and the second column vector established on the basis of the coordinate values in the second coordinate system, and is specifically embodied by the scaling transformation coefficient, the rotation transformation matrix and the translation transformation column vector. A format of the rotation transformation matrix is $$\begin{bmatrix} \cos\theta & -\sin\theta \\ \sin\theta & \cos\theta \end{bmatrix}, \text{ or } \begin{bmatrix} \cos\theta & \sin\theta \\ -\sin\theta & \cos\theta \end{bmatrix}.$$

A sequence of two elements of the translation transformation column vector is the same as the first column vector and the second column vector. That is, when the elements of the first column vector and the second column vector are: abscissas and ordinates respectively, the elements of the translation transformation column vector are: an abscissa translation coefficient and an ordinate translation coefficient respectively.

Step S30666: a scaling coefficient, rotation coefficient and translation coefficient between the first two-dimensional rectangular coordinate system and the second two-dimensional rectangular coordinate system are calculated to obtain the second conversion relationship, wherein the scaling transformation coefficient is the scaling coefficient, a rotation angle θ in the rotation transformation matrix is the rotation coefficient, and two elements of a translation transformation column vector correspond to an abscissa translation coefficient and an ordinate translation coefficient.

To sum up, the steps included in Step S3066 are mainly adopted to obtain a calculation method and calculation parameter for the coordinate value in the first two-dimensional rectangular coordinate system and the coordinate value in the second two-dimensional rectangular coordinate system according to the created corresponding relationship between the coordinate value in the first two-dimensional rectangular coordinate system and the coordinate value in the second two-dimensional rectangular coordinate system. When the conversion relationship between the GPS information and the PTZ coordinate or the second conversion relationship exists, Step S306 is not a necessary step of the method for target tracking provided by embodiment 1 of the disclosure.

Preferably, the scaling coefficient, rotation coefficient and translation coefficient between the first two-dimensional rectangular coordinate system and the second two-dimensional rectangular coordinate system are calculated according to the following formula:

$$\alpha \begin{bmatrix} \cos\theta & -\sin\theta \\ \sin\theta & \cos\theta \end{bmatrix} \begin{bmatrix} P_{1x} \\ P_{1y} \end{bmatrix} + \begin{bmatrix} a \\ b \end{bmatrix} = \begin{bmatrix} Q_{1x} \\ Q_{1y} \end{bmatrix}, \text{ and}$$

$$\alpha \begin{bmatrix} \cos\theta & -\sin\theta \\ \sin\theta & \cos\theta \end{bmatrix} \begin{bmatrix} P_{2x} \\ P_{2y} \end{bmatrix} + \begin{bmatrix} a \\ b \end{bmatrix} = \begin{bmatrix} Q_{2x} \\ Q_{2y} \end{bmatrix},$$

where $\alpha$ is the scaling coefficient, $\theta$ is the rotation coefficient, a is the abscissa translation coefficient, b is the ordinate translation coefficient, $P_{1x}$ is an abscissa value of the first monitoring point in the at least two monitoring points in the first two-dimensional rectangular coordinate system, and $P_{1y}$ is an ordinate value of the first monitoring point in the at least two monitoring points in the first two-dimensional rectangular coordinate system, $Q_{1x}$ is an abscissa value of the first monitoring point in the second two-dimensional rectangular coordinate system, and $Q_{1y}$ is an ordinate value of the first monitoring point in the second two-dimensional rectangular coordinate system, $P_{2x}$ is an abscissa value of the second monitoring point in the at least two monitoring points in the first two-dimensional rectangular coordinate system, and $P_{2y}$ is an ordinate value of the second monitoring point in the at least two monitoring points in the first two-dimensional rectangular coordinate system, and $Q_{2x}$ is an abscissa value of the second monitoring point in the second two-dimensional rectangular coordinate system and $Q_{2y}$ is an ordinate value of the second monitoring point in the second two-dimensional rectangular coordinate system.

Preferably, when the scaling transformation coefficient, the rotation transformation matrix and the translation transformation column vector are calculated by virtue of coordinate values of three or more monitoring points, the method for acquiring the scaling coefficient, rotation coefficient and translation coefficient between the first two-dimensional rectangular coordinate system and the second two-dimensional rectangular coordinate system further includes that: fitted values of the scaling coefficient, the rotation coefficient and the translation coefficient under a mean square error are obtained by a least square method.

The solution provided by embodiment 1 of the disclosure will be further described below with a specific example.

Figure 2:
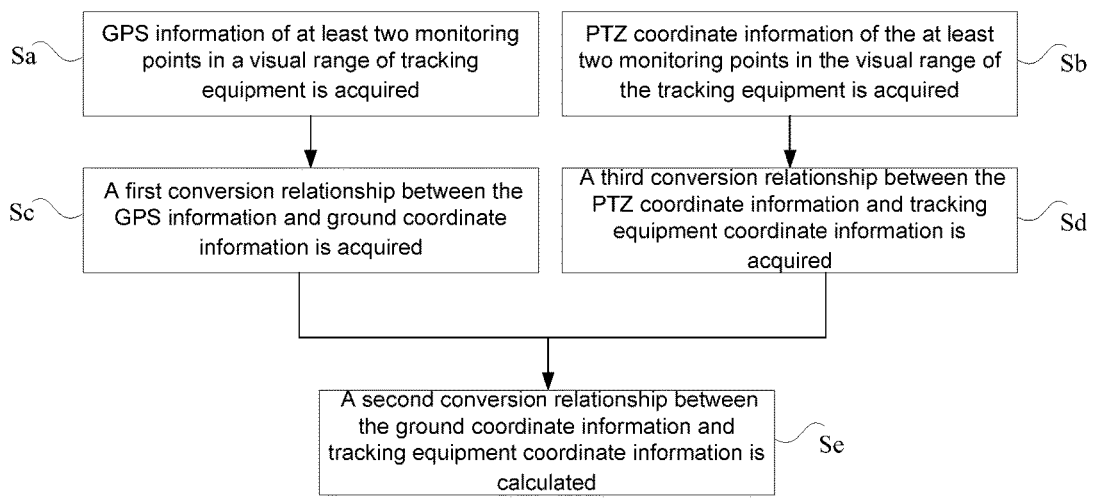
FIG. 2 is a flowchart of a method for acquiring a conversion relationship according to embodiment 1 of the disclosure.

FIG. 2 is a flowchart of a method for acquiring a conversion relationship according to embodiment 1 of the disclosure. The conversion relationship is a conversion relationship between GPS information and PTZ coordinate information, and includes a first conversion relationship between the GPS information and ground coordinate information, a second conversion relationship between the ground coordinate information and tracking equipment coordinate information and a third conversion relationship between the tracking equipment coordinate information and the PTZ coordinate information.

The method for acquiring the conversion relationship according to the embodiment may be a preferred implementation mode of acquiring the conversion relationship in the method for target tracking of the abovementioned embodiment. As shown in FIG. 2, the method for acquiring the conversion relationship includes the following steps.

Step Sa: GPS information of at least two monitoring points in a visual range of a tracking equipment is acquired, and a latitude data and a longitude data in the GPS information are acquired, wherein the latitude data of the first monitoring point in the at least two monitoring points is $N_1$, and the longitude data of the first monitoring point in the at least two monitoring points is $E_1$, and the latitude data of the second monitoring point in the at least two monitoring points is $N_2$, and the longitude data of the second monitoring point in the at least two monitoring points is $E_2$.

Step Sb: PTZ coordinate information of the at least two monitoring points in the visual range of the tracking equipment is acquired, and for the at least two monitoring points selected in Step Sa, PTZ information when the tracking equipment locks the selected points in a center of an image being acquired as the PTZ coordinate information of the selected points, wherein a P parameter $\theta_1$ and a T parameter $\phi_1$ of the first monitoring point in the at least two monitoring points, and a P parameter $\theta_2$ and a T parameter $\phi_2$ of the second monitoring point in the at least two monitoring points are included.

Step Sc: a first conversion relationship between the GPS information and ground coordinate information is acquired, wherein Step Sc further includes the following steps.

Step Sc1: a first two-dimensional rectangular coordinate system is established, wherein a coordinate origin of the first two-dimensional rectangular coordinate system is the first monitoring point in the at least two monitoring points, and abscissa axes of the first two-dimensional rectangular coordinate system point to due north, and ordinate axes of the first two-dimensional rectangular coordinate system point to due west.

Step Sc2: a latitude distance difference $d_1$ and longitude distance difference $d_2$ between the first monitoring point in the at least two monitoring points and the coordinate origin, and the coordinate origin and a latitude distance difference $d_3$ and longitude distance difference $d_4$ between the second monitoring point in the at least two monitoring points and the coordinate origin, are calculated according to the following formula:

$$d_1 = 0,$$
$$d_2 = 0,$$
$$d_3 = \frac{(N_2 - N_1)}{180} \times \pi \times R, \text{ and}$$
$$d_4 = \frac{(E_1 - E_2)}{180} \times \pi \times R \times \cos(N_1/180 \times \pi),$$

where R is the earth radius.

Step Sc3: the latitude distance difference and longitude distance difference of each monitoring point in the at least two monitoring points are converted into a coordinate value in the first two-dimensional rectangular coordinate system, and when a first proportionality coefficient is $\frac{180}{\pi \times R}$, the coordinate values $P_1$ of the first monitoring point and $P_2$ of the second monitoring point in the at least two monitoring points, in the first two-dimensional rectangular coordinate system are respectively:

$P_1 = (0,0)$, and $P_2 = ((N_2-N_1),(E_1-E_2) \times \cos(N_1/180 \times \pi))$.

Step Sd: a third conversion relationship between the PTZ coordinate information and tracking equipment coordinate information is acquired, wherein Step Sd further includes the following steps.

Step Sd1: a second two-dimensional rectangular coordinate system is established, wherein the second two-dimensional rectangular coordinate system takes the tracking equipment as an origin, an abscissa axis of the second two-dimensional rectangular coordinate system points to a direction to which the tracking equipment points when a horizontal rotation angle of the tracking equipment is 90°, and an ordinate axis of the second two-dimensional rectangular coordinate system points to a direction to which the tracking equipment points when the horizontal rotation angle of the tracking equipment is 0°.

Step Sd2: calculation formula for an abscissa component $d_5$ and ordinate component $d_6$ of the first monitoring point in the second two-dimensional rectangular coordinate system, and an abscissa component $d_7$ and ordinate component $d_8$ of the second monitoring point in the second two-dimensional rectangular coordinate system are respectively:

$d_5 = h/\tan(\phi_1/180 \times \pi) \times \sin(\theta_1/180 \times \pi)$, $d_6 = h/\tan(\phi_1/180 \times \pi) \times \cos(\theta_1/180 \times \pi)$, $d_7 = h/\tan(\phi_2/180 \times \pi) \times \sin(\theta_2/180 \times \pi)$, and $d_8 = h/\tan(\phi_2/180 \times \pi) \times \cos(\theta_2/180 \times \pi)$.

Step Sd3: the coordinate components of each monitoring point in the at least two monitoring points are converted into a coordinate value in the second rectangular coordinate system, a second proportionality coefficient is $1/h$, and the coordinate values $Q_1$ of the first monitoring point in the at least two monitoring points in the second rectangular coordinate system, and $Q_2$ of the second monitoring point in the at least two monitoring points in the second rectangular coordinate system are respectively:

$Q_1 = (1/\tan(\phi_1/180 \times \pi) \times \sin(\theta_1/180 \times \pi), 1/\tan(\phi_1/180 \times \pi) \times \cos(\theta_1/180 \times \pi))$, and $Q_2 = (1/\tan(\phi_2/180 \times \pi) \times \sin(\theta_2/180 \times \pi), 1/\tan(\phi_2/180 \times \pi) \times \cos(\theta_2/180 \times \pi))$, where h is a height of the tracking equipment.

Step Se: a second conversion relationship between the ground coordinate information and tracking equipment coordinate information is calculated, wherein Step Se further includes the following steps.

Step Se1: ground coordinate information $P_1$ and $P_2$ of at least two monitoring points in a picture of the tracking equipment in the first two-dimensional rectangular coordinate system is read.

Step Se2: tracking equipment coordinate information $Q_1$ and $Q_2$ of the at least two monitoring points in the second two-dimensional rectangular coordinate system is read.

Step Se3: a corresponding relationship between a coordinate value in the first two-dimensional rectangular coordinate system and a coordinate value in the second two-dimensional rectangular coordinate system is created, so as to acquire the second conversion relationship, wherein $P_1$ corresponds to $Q_1$, and $P_2$ corresponds to $Q_2$.

The following calculation steps are specifically included.

Step Se31: a third column vector $[P_{1x}, P_{1y}]^T$ is established according to the coordinate value $P_1$ of the first monitoring point in the first two-dimensional rectangular coordinate system, and a fourth column vector $[Q_{1x}, Q_{1y}]^T$ is established according to the coordinate value $Q_1$ of the first monitoring point in the second two-dimensional rectangular coordinate system; and a fifth column vector $[P_{2x}, P_{2y}]^T$ is established according to the coordinate value $P_2$ of the second monitoring point in the first two-dimensional rectangular coordinate system, and a sixth column vector $[Q_{2x}, Q_{2y}]^T$ is established according to the coordinate value $Q_2$ of the second monitoring point in the second two-dimensional rectangular coordinate system.

Step Se32: a corresponding relationship between a first column vector and a second column vector is created:

$$\alpha \begin{bmatrix} \cos\theta & -\sin\theta \\ \sin\theta & \cos\theta \end{bmatrix} \begin{bmatrix} P_{1x} \\ P_{1y} \end{bmatrix} + \begin{bmatrix} a \\ b \end{bmatrix} = \begin{bmatrix} Q_{1x} \\ Q_{1y} \end{bmatrix}, \text{ and}$$

$$\alpha \begin{bmatrix} \cos\theta & -\sin\theta \\ \sin\theta & \cos\theta \end{bmatrix} \begin{bmatrix} P_{2x} \\ P_{2y} \end{bmatrix} + \begin{bmatrix} a \\ b \end{bmatrix} = \begin{bmatrix} Q_{2x} \\ Q_{2y} \end{bmatrix},$$

where $\alpha$ is a scaling transformation coefficient, $$\begin{bmatrix} \cos\theta & -\sin\theta \\ \sin\theta & \cos\theta \end{bmatrix}$$

is a rotation transformation matrix, and $$\begin{bmatrix} a \\ b \end{bmatrix}$$

is a translation transformation column vector.

Step Se33: a scaling coefficient, rotation coefficient and translation coefficient between the first two-dimensional rectangular coordinate system and the second two-dimensional rectangular coordinate system are calculated to obtain the second conversion relationship according to the corresponding relationship created in Step Se32, wherein the scaling transformation coefficient is the scaling coefficient $\alpha$, a rotation angle $\theta$ in the rotation transformation matrix is the rotation coefficient $\theta$, and two elements of the translation transformation column vector correspond to an abscissa translation coefficient a and an ordinate translation coefficient b.

Preferably, the corresponding relationship involved in Step Se32 may be transformed into:

$$\begin{bmatrix} P_{1x} & -P_{1y} & 1 & 0 \\ P_{1y} & P_{1x} & 0 & 1 \end{bmatrix} \begin{bmatrix} \alpha\cos\theta \\ \alpha\sin\theta \\ a \\ b \end{bmatrix} = \begin{bmatrix} Q_{1x} \\ Q_{1y} \end{bmatrix}, \text{ and}$$

$$\begin{bmatrix} P_{2x} & -P_{2y} & 1 & 0 \\ P_{2y} & P_{2x} & 0 & 1 \end{bmatrix} \begin{bmatrix} \alpha\cos\theta \\ \alpha\sin\theta \\ a \\ b \end{bmatrix} = \begin{bmatrix} Q_{2x} \\ Q_{2y} \end{bmatrix},$$

The corresponding relationship of the two monitoring points may be combined to obtain:

$$\begin{bmatrix} P_{1x} & -P_{1y} & 1 & 0 \\ P_{1y} & P_{1x} & 0 & 1 \\ P_{2x} & -P_{2y} & 1 & 0 \\ P_{2y} & P_{2x} & 0 & 1 \end{bmatrix} \begin{bmatrix} \alpha\cos\theta \\ \alpha\sin\theta \\ a \\ b \end{bmatrix} = \begin{bmatrix} Q_{1x} \\ Q_{1y} \\ Q_{2x} \\ Q_{2y} \end{bmatrix}.$$

According to the abovementioned formula, totally 4 parameters, i.e. $\alpha\cos\theta$, $\alpha\sin\theta$, a and b, may be solved according to the abovementioned equation under the condition that $Q_1$, $Q_2$, $P_1$ and $P_2$ are acquired.

If more than three points are selected, fitted values of $\alpha\cos\theta$, $\alpha\sin\theta$, a and b under a mean square error may also be obtained by a least square method, specifically as shown in the following formula:

$$\begin{bmatrix} P_{1x} & -P_{1y} & 1 & 0 \\ P_{1y} & P_{1x} & 0 & 1 \\ P_{2x} & -P_{2y} & 1 & 0 \\ P_{2y} & P_{2x} & 0 & 1 \\ P_{3x} & -P_{3y} & 1 & 0 \\ P_{3y} & P_{3x} & 0 & 1 \\ \vdots & \vdots & \vdots & \vdots \end{bmatrix} \begin{bmatrix} \alpha\cos\theta \\ \alpha\sin\theta \\ a \\ b \end{bmatrix} = \begin{bmatrix} Q_{1x} \\ Q_{1y} \\ Q_{2x} \\ Q_{2y} \\ Q_{3x} \\ Q_{3y} \\ \vdots \end{bmatrix},$$

By Step Sa~Step Se, after the conversion relationship between the GPS information and the PTZ coordinate information is obtained, the conversion relationship is stored, and target tracking is further implement according to the conversion relationship.

A specific method for target tracking based on the specific example of embodiment 1 is as follows.

Step Si: GPS information of a target object monitored by tracking equipment is acquired, wherein it is set that the target object is positioned at a point R, and then latitude data in acquired GPS information of the point R is $N_R$, and longitude data is $E_R$.

Step Sj: PTZ coordinate information corresponding to the GPS information of the target object is obtained according to a pre-stored conversion relationship between GPS information and PTZ coordinate information.

Wherein, Step Sj further includes the following steps.

Step Sj1: the currently acquired GPS information of the target object is converted into ground coordinate information according to a first conversion relationship, and the latitude data $N_R$ and longitude data $E_R$ of the target object are converted into a coordinate $P_R$ in a first two-dimensional rectangular coordinate system according to the first conversion relationship calculated in Step Sc3:

$$P_R = ((N_R - N_1), (E_1 - E_R) \times \cos(N_1/180 \times \pi)),$$

where $N_1$ is latitude data of a coordinate origin, and $E_1$ is longitude data of a coordinate origin.

Step Sj2: the ground coordinate information obtained by conversion is converted into tracking equipment coordinate information according to a second conversion relationship, and the coordinate $P_R$ of the target object in the first two-dimensional rectangular coordinate system is converted into its coordinate in a second two-dimensional rectangular coordinate system according to a conversion relationship, obtained by Step Se, between the first two-dimensional rectangular coordinate system and the second two-dimensional rectangular coordinate system:

$$Q_R = (P_{Rx} \times \alpha \cos\theta - P_{Ry} \times \alpha \sin\theta + a, P_{Rx} \times \alpha \sin\theta + P_{Ry} \times \alpha \cos\theta + b),$$

where $P_{Rx}$ is $N_R - N_1$ and $P_{Ry}$ is $(E_1 - E_R) \times \cos(N_1/180 \times \pi)$, where $\alpha \cos\theta$, $\alpha \sin\theta$, a and b are parameters solved in Step Se.

Step Sj3: the tracking equipment coordinate information obtained by conversion is converted into PTZ coordinate information of the tracking equipment according to a third conversion relationship.

When $Q_R$ is calculated, PTZ coordinate information corresponding to the point may be obtained according to the conversion relationship, calculated in Step Sd, between the PTZ coordinate information and the tracking equipment coordinate information:

P coordinate information is:

$$P = \tan^{-1}(Q_{Rx}, Q_{Ry})/\pi \times 180, \text{ and}$$

T coordinate information is:

$$T = \tan^{-1}(1, \sqrt{Q_{Rx} \times Q_{Rx} + Q_{Ry} \times Q_{Ry}})/\pi \times 180.$$

Embodiment 2

Embodiment 2 of the disclosure further provides a device for target tracking. It is important to note that the target tracking device of embodiment 2 of the disclosure may be configured to execute the method for target tracking provided by embodiment 1 of the disclosure, and the method for target tracking of embodiment 1 of the disclosure may also be executed by the target tracking device provided by embodiment 2 of the disclosure.

Figure 3:
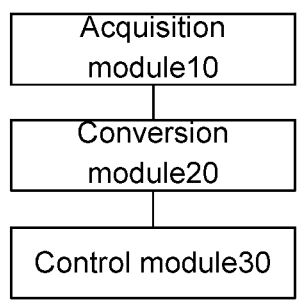
FIG. 3 is a schematic diagram of a device for target tracking according to embodiment 2 of the disclosure.

FIG. 3 is a schematic diagram of a device for target tracking according to embodiment 2 of the disclosure. As shown in FIG. 3, the target tracking device of embodiment 2 of the disclosure includes:

an acquisition module 10, configured to acquire GPS information of a target object monitored by tracking equipment;

a conversion module 20, configured to obtain PTZ coordinate information corresponding to the GPS information of the target object according to a pre-stored conversion relationship between GPS information and PTZ coordinate information; and a control module 30, configured to regulate the tracking equipment to control the tracking equipment to monitor the target object according to the PTZ coordinate information of the target object.

It is important to note here that the acquisition module 10, the conversion module 20 and the control module 30 may run in monitoring terminal as a part of the device, functions realized by the modules may be executed by a processor in the monitoring terminal, and the monitoring terminal may also be terminal equipment such as a video camera, an intelligent mobile phone (such as an Android mobile phone and an iOS mobile phone), a tablet computer, a palm computer, a Mobile Internet Device (MID) and a PAD.

Preferably, before the conversion module, the device further includes:

a storage module 15, configured to store the conversion relationship between the GPS information and the PTZ coordinate information, wherein the conversion relationship includes: a first conversion relationship between the GPS information and ground coordinate information, a second conversion relationship between the ground coordinate information and tracking equipment coordinate information and a third conversion relationship between the PTZ coordinate information and the tracking equipment coordinate information, wherein the ground coordinate information is a coordinate value in a first two-dimensional rectangular coordinate system, the tracking equipment coordinate information is a coordinate value in a second two-dimensional rectangular coordinate system, and the second two-dimensional rectangular coordinate system adopts an upright tube of the tracking equipment as an origin.

It is important to note here that the storage module 15 may also run in the monitoring terminal as a part of the device, the function realized by the module may be executed by the processor in the monitoring terminal, and the monitoring terminal may also be terminal equipment such as a video camera, an intelligent mobile phone (such as an Android mobile phone and an iOS mobile phone), a tablet computer, a palm computer, an MID (Mobile Internet Devices) and a PAD.

Preferably, the conversion module 20 includes:

a first conversion unit 21, configured to convert the currently acquired GPS information of the target object into ground coordinate information corresponding to the target object according to the first conversion relationship;

a second conversion unit 22, configured to convert the ground coordinate information, obtained by conversion, corresponding to the target object into tracking equipment coordinate information corresponding to the target object according to the second conversion relationship; and a third conversion unit 23, configured to convert the tracking equipment coordinate information, obtained by conversion, corresponding to the target object into the PTZ coordinate information corresponding to the target object according to the third conversion relationship.

It is important to note here that the first conversion unit 21, the second conversion unit 22 and the third conversion unit 23 may also run in the monitoring terminal as a part of the device, the functions realized by the modules may be executed by the processor in the monitoring terminal, and the monitoring terminal may also be terminal equipment such as a video camera, an intelligent mobile phone (such as an Android mobile phone and an iOS mobile phone), a tablet computer, a palm computer, an MID (Mobile Internet Devices) and a PAD.

Preferably, a unit which calculates the first conversion relationship between the GPS information and the ground coordinate information includes:

a first establishment subunit, configured to establish a first two-dimensional rectangular coordinate system, wherein abscissa axes of the first two-dimensional rectangular coordinate system point to any two directions in due east, due west, due south and due north, and ordinate axes of the first two-dimensional rectangular coordinate system point to any two directions in due east, due west, due south and due north;

a first reading subunit, configured to read GPS information of a coordinate origin of the first two-dimensional rectangular coordinate system, and read GPS information of a monitoring point in a monitoring picture of the tracking equipment, the GPS information including: latitude data and longitude data; and a first creation subunit, configured to create a corresponding relationship between the GPS information of the monitoring point and a coordinate value of the monitoring point in the first two-dimensional rectangular coordinate system to acquire the first conversion relationship, wherein the first conversion relationship is configured to represent a corresponding relationship between a latitude data difference value and longitude data difference value of the monitoring point and the coordinate origin and an abscissa coordinate value and ordinate value of the monitoring point in the first two-dimensional rectangular coordinate system.

It is important to note here that the first establishment subunit, the first reading subunit and the first creation subunit may also run in the monitoring terminal as a part of the device, the functions realized by the modules may be executed by the processor in the monitoring terminal, and the monitoring terminal may also be terminal equipment such as a video camera, an intelligent mobile phone (such as an Android mobile phone and an iOS mobile phone), a tablet computer, a palm computer, an MID and a PAD.

Preferably, a unit which calculates the third conversion relationship between the PTZ coordinate information and the tracking equipment coordinate information includes:

a second establishment subunit, configured to establish a second two-dimensional rectangular coordinate system, wherein the second two-dimensional rectangular coordinate system takes the tracking equipment as an origin, directions of abscissa and ordinate axes of the second two-dimensional rectangular coordinate system are directions to which the tracking equipment points when a horizontal rotation angle difference of the tracking equipment is 90° respectively;

a second reading subunit, configured to read PTZ coordinate information of the monitoring point in the picture of the tracking equipment; and a second creation subunit, configured to create a corresponding relationship between the PTZ coordinate information of the monitoring point and a coordinate value of the monitoring point in the second two-dimensional rectangular coordinate system to acquire the third conversion relationship.

It is important to note here that the second establishment subunit, the second reading subunit and the second creation subunit may also run in the monitoring terminal as a part of the device, the functions realized by the modules may be executed by the processor in the monitoring terminal, and the monitoring terminal may also be terminal equipment such as a video camera, an intelligent mobile phone (such as an Android mobile phone and an iOS mobile phone), a tablet computer, a palm computer, an MID and a PAD.

Preferably, a unit which calculates the second conversion relationship between the ground coordinate information and the tracking equipment coordinate information includes a third reading unit, configured to read ground coordinate information of at least two monitoring points in the picture of the tracking equipment in the first two-dimensional rectangular coordinate system;

a fourth reading subunit, configured to read tracking equipment coordinate information of the at least two monitoring points in the second two-dimensional rectangular coordinate system; and a third creation subunit, configured to create a corresponding relationship between a coordinate value in the first two-dimensional rectangular coordinate system and a coordinate value in the second two-dimensional rectangular coordinate system to acquire the second conversion relationship, wherein the second conversion relationship is configured to represent a corresponding relationship between a coordinate value in the first two-dimensional rectangular coordinate system and a coordinate value in the second two-dimensional rectangular coordinate system of the same monitoring point.

It is important to note here that the third reading subunit, the fourth reading subunit and the third creation subunit may also run in the monitoring terminal as a part of the device, the functions realized by the modules may be executed by the processor in the monitoring terminal, and the monitoring terminal may also be terminal equipment such as a video camera, an intelligent mobile phone (such as an Android mobile phone and an iOS mobile phone), a tablet computer, a palm computer, an MID and a PAD.

Embodiment 3

Embodiment 3 of the disclosure further provides a system for target tracking. It is important to note that the target tracking system of embodiment 3 of the disclosure may be configured to execute the method for target tracking provided by embodiment 1 of the disclosure, and the method for target tracking of embodiment 1 of the disclosure may also be executed by the target tracking system provided by embodiment 3 of the disclosure.

Figure 4:
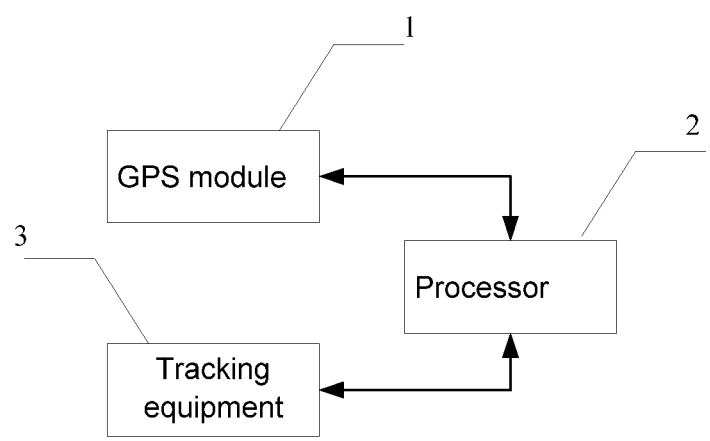
FIG. 4 is a schematic diagram of a system for target tracking according to embodiment 3 of the disclosure.

FIG. 4 is a schematic diagram of a system for target tracking according to embodiment 3 of the disclosure. As shown in FIG. 4, the target tracking system of embodiment 3 of the disclosure includes:

a GPS module 1, configured to acquire GPS information of a target object monitored by tracking equipment;

a processor 2, configured to obtain PTZ coordinate information corresponding to the GPS information of the target object according to a pre-stored conversion relationship between GPS information and PTZ coordinate information; and the tracking equipment 3, configured to monitor the target object according to the PTZ coordinate information of the target object.

Alternatively, the processor 2 may be an independent processor, and may also be a processor integrated in the tracking equipment 3.

Preferably, the processor 2 executes the method for target tracking provided by embodiment 1 of the disclosure.

Step A: the processor 2 acquires the GPS information, provided by the GPS module 1, of the target object, the target object is a target object monitored by the tracking equipment.

Specifically, in Step A, the tracking equipment may be any one of tracking equipment which may be controlled by a PTZ parameter, and the tracking equipment usually includes a tripod head or an interface connected with the tripod head. The target object carries a GPS module, and the GPS information of the module may be acquired in real time. The GPS information is information received through the GPS module, and data, received by the GPS module, in a fixed format may be extracted to acquire latitude data and longitude data of the target object, wherein the latitude data may be northern latitude data of the latitude hemisphere N, i.e. the northern hemisphere, or southern latitude data of the latitude hemisphere S, i.e. the southern hemisphere, and the longitude data may be eastern longitude data of the longitude hemisphere E, i.e. the eastern hemisphere, or western longitude data of the longitude hemisphere W, i.e. the western hemisphere. A tracking target is positioned within a monitoring range of the tracking equipment.

Step C: the processor 2 obtains the PTZ coordinate information corresponding to the GPS information of the target object according to the pre-stored conversion relationship between the GPS information and the PTZ coordinate information.

Specifically, in Step C, the PTZ coordinate information is a PTZ parameter of the tripod head of the tracking equipment when the tracking equipment locks the target object at a certain fixed position in a visual field of the lens. Alternatively, the PTZ coordinate information is a PTZ parameter of the tripod head of the tracking equipment when the tracking equipment locks the target object at a central position of the visual field of the lens. The pre-stored conversion between the GPS information and the PTZ coordinate information is a mutual conversion relationship between GPS information and PTZ coordinate information of any point in a visual range of the tracking equipment, and after the conversion relationship is determined, GPS information of a certain position of the target object and PTZ coordinate information of the position are uniquely determined and correspond to each other. Therefore, GPS information of any point in a movement path of the target object may be obtained to obtain PTZ coordinate information of the target object at the point.

Step E: the processor 2 regulates the tracking equipment to control the tracking equipment to monitor the target object according to the PTZ coordinate information of the target object.

Specifically, in Step E, after the PTZ coordinate information corresponding to the GPS information of the target object is obtained, the tripod head of the tracking equipment regulates a monitoring visual angle and monitoring ratio of the tracking equipment to lock the target object according to the PTZ coordinate information.

Preferably, before Step C, the processor 2 further executes:

Step B: the conversion relationship between the GPS information and the PTZ coordinate information is stored, wherein the conversion relationship includes: a first conversion relationship between the GPS information and ground coordinate information, a second conversion relationship between the ground coordinate information and tracking equipment coordinate information and a third conversion relationship between the PTZ coordinate information and the tracking equipment coordinate information.

Specifically, in Step B, the ground coordinate information is a coordinate value in a first two-dimensional rectangular coordinate system, the tracking equipment coordinate information is a coordinate value in a second two-dimensional rectangular coordinate system, and the second two-dimensional rectangular coordinate system adopts an upright tube of the tracking equipment as an origin, wherein the first position may be any position. The tracking equipment coordinate information is unrelated to a specific geographical position of the tracking equipment, and represents the coordinate information of the target object in the second two-dimensional rectangular coordinate system established on the basis of the tracking equipment, wherein the first two-dimensional rectangular coordinate system and the second two-dimensional rectangular coordinate system are both two-dimensional rectangular coordinate systems parallel to the ground. A coordinate origin of the first two-dimensional rectangular coordinate system may be any point, and only GPS information of the coordinate origin is required to be acquired.

Each function unit provided by the embodiment of the disclosure may run in a monitoring terminal, a computer terminal or a similar computing device, and may also be stored as a part of a storage medium. The monitoring terminal may be a video camera.

Therefore, the embodiment of the disclosure may provide a monitoring terminal, which may be any monitoring terminal equipment in a monitoring terminal group. Alternatively, in the embodiment, the monitoring terminal may also be replaced with terminal equipment such as a video camera.

Alternatively, in the embodiment, the monitoring terminal may be at least a monitoring equipment in more monitoring equipment of a monitoring network.

In the embodiment, the monitoring terminal may execute program codes of the following steps in a method for target tracking: acquiring Global Positioning System (GPS) information of a target object monitored by tracking equipment; obtaining Pan/Tilt/Zoom (PTZ) coordinate information corresponding to the GPS information of the target object according to a pre-stored conversion relationship between GPS information and PTZ coordinate information; and regulating the tracking equipment according to the PTZ coordinate information of the target object to control the tracking equipment to monitor the target object.

Alternatively, the monitoring terminal may include: one or more processors, a memory and a transmission device.

Wherein, the memory may be configured to store a software program and a module, such as a program instruction/module corresponding to the method for target tracking and device in the embodiments of the disclosure. The processor runs the software program and module stored in the memory, thereby executing various function applications and data processing, namely implementing the method for target tracking. The memory may include a high-speed Random Access Memory (RAM), and may also include a nonvolatile memory, such as one or more magnetic storage devices, flash memories or other nonvolatile solid-state memories. In some embodiments, the memory may further include memories remotely arranged relative to the processor, and these remote memories may be connected to the terminal through a network. An example of the network includes, but not limited to, a Internet, an internet of an enterprise, a local area network, a mobile communication network and a combination of the Internet, the internet of an enterprise, the local area network and mobile communication network.

The transmission device is configured to receive or send data through a network. A specific example of the network may include a wired network and a wireless network. In an example, the transmission device includes a Network Interface Controller (NIC), which may be connected with other network equipment and a router through a network cable, thereby communicating with the Internet or a local area network. In an example, the transmission device is a Radio Frequency (RF) module, which is configured to communicate with the Internet in a wireless manner.

Wherein, the memory is specifically configured to store the pre-stored conversion relationship between the GPS information and the PTZ coordinate information, a calculation formula and an application program.

The processor may call the information and application program stored by the memory through the transmission device to execute the program codes of the steps of the method in each alternative or preferred embodiment in the method embodiment.

Those skilled in the art should know that the monitoring terminal may also be terminal equipment such as a video camera, an intelligent mobile phone (such as an Android mobile phone and an iOS mobile phone), a tablet computer, a palm computer, an MID and a PAD.

Those skilled in the art should know that all or part of the steps in various methods of the abovementioned embodiment may be implement by instructing related hardware of terminal equipment by a program, the program may be stored in a storage medium readable for a monitoring terminal, and the storage medium may include: a flash disk, a Read-Only Memory (ROM), a RAM, a magnetic disk, an optical disk or the like.

The embodiment of the disclosure further provides a storage medium. Alternatively, in the embodiment, the storage medium may be configured to store program codes executed by the method for target tracking provided by the method embodiment and the device embodiment.

Alternatively, in the embodiment, the storage medium may be located in any monitoring terminal in a monitoring terminal group in a monitoring network, or located in any monitoring terminal in a monitoring terminal group.

Alternatively, in the embodiment, the storage medium is configured to store the program codes configured to execute the following steps that: GPS information of a target object monitored by tracking equipment is acquired; PTZ coordinate information corresponding to the GPS information of the target object is obtained according to a pre-stored conversion relationship between GPS information and PTZ coordinate information; and the tracking equipment is regulated to control the tracking equipment to monitor the target object according to the PTZ coordinate information of the target object.

Alternatively, in the embodiment, the storage medium may further be configured to store program codes for various preferred or alternative method steps provided by the method for target tracking.

The method, device and system for target tracking according to the disclosure are described above with reference to the drawings with examples. However, those skilled in the art should know that various improvements to the method, device and system for target tracking disclosed in the disclosure may further be made without departing from the contents of the disclosure. Therefore, the scope of protection of the disclosure shall be determined according to contents of the appended claims.

It is important to note that each abovementioned method embodiment is expressed as a combination of a series of operations to simplify descriptions, but those skilled in the art should know that the disclosure is not limited to a sequence of the described operations because some steps may be executed in another sequence or at the same time according to the disclosure. Second, those skilled in the art should also know that the embodiments described in the specification belong to preferred embodiments and involved operations and modules are not necessary to the disclosure.

Each embodiment in the abovementioned embodiments is described with different emphases, and parts which are not elaborated in a certain embodiment may refer to related descriptions of the other embodiments.

In some embodiments provided by the disclosure, it should be understood that the disclosed device may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between the displayed or discussed components may be indirect coupling or communication connection, implemented through some interfaces, of the device or the units, and may be electrical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the disclosure according to a practical requirement.

In addition, each function unit in each embodiment of the disclosure may be integrated into a processing unit, each unit may also exist independently, and two or more than two unit may also be integrated into a unit. The abovementioned integrated unit may be implemented in a hardware form, and may be implemented in form of hardware, and may also be implemented in form of software function unit.

When being implemented in form of software function unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable computer equipment (which may be a personal computer, a mobile terminal, a server, network equipment or the like) to execute all or part of the method in each embodiment of the disclosure. The abovementioned storage medium includes: various media capable of storing program codes such as a U disk, a ROM, a RAM, a mobile hard disk, a magnetic disk or an optical disk.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

What is claimed is:

1. A method for target tracking, comprising:

acquiring Global Positioning System (GPS) information of a target object monitored by tracking equipment, wherein the target object is positioned within a monitoring range of the tracking equipment;

obtaining Pan/Tilt/Zoom (PTZ) coordinate information corresponding to the GPS information of the target object according to a pre-stored conversion relationship between GPS information and PTZ coordinate information, wherein the pre-stored conversion relationship between the GPS information and the PTZ coordinate information is a mutual conversion relationship between GPS information and PTZ coordinate information of any point in a visual range of the tracking equipment; and regulating the tracking equipment according to the PTZ coordinate information of the target object to control the tracking equipment to monitor the target object.

2. The method according to claim 1, before obtaining the PTZ coordinate information corresponding to the GPS information of the target object according to the pre-stored conversion relationship between the GPS information and the PTZ coordinate information, further comprising:

storing the conversion relationship between the GPS information and the PTZ coordinate information, wherein the conversion relationship comprises: a first conversion relationship between the GPS information and ground coordinate information, a second conversion relationship between the ground coordinate information and tracking equipment coordinate information and a third conversion relationship between the PTZ coordinate information and the tracking equipment coordinate information, wherein the ground coordinate information is a coordinate value in a first two-dimensional rectangular coordinate system, the first two-dimensional rectangular coordinate system adopts any point on a ground-based plane as a coordinate origin, the tracking equipment coordinate information is a coordinate value in a second two-dimensional rectangular coordinate system, and the second two-dimensional rectangular coordinate system adopts an upright tube of the tracking equipment as a coordinate origin.

3. The method according to claim 2, wherein obtaining the PTZ coordinate information corresponding to the GPS information of the target object according to the pre-stored conversion relationship between the GPS information and the PTZ coordinate information comprises:

converting the currently acquired GPS information of the target object into ground coordinate information corresponding to the target object according to the first conversion relationship;

converting the ground coordinate information, obtained by conversion, corresponding to the target object into tracking equipment coordinate information corresponding to the target object according to the second conversion relationship; and converting the tracking equipment coordinate information, obtained by conversion, corresponding to the target object into the PTZ coordinate information corresponding to the target object according to the third conversion relationship.

4. The method according to claim 2, wherein a step of acquiring the first conversion relationship between the GPS information and the ground coordinate information before storing the conversion relationship between the GPS information and the PTZ coordinate information comprises:

establishing the first two-dimensional rectangular coordinate system, wherein abscissa and ordinate axes of the first two-dimensional rectangular coordinate system point to any two directions in due east, due west, due south and due north respectively;

reading GPS information of the coordinate origin of the first two-dimensional rectangular coordinate system, and reading GPS information of a monitoring point in a monitoring picture of the tracking equipment, the GPS information comprising: latitude data and longitude data; and creating a corresponding relationship between the GPS information of the monitoring point and a coordinate value of the monitoring point in the first two-dimensional rectangular coordinate system to acquire the first conversion relationship, wherein the first conversion relationship is configured to represent a corresponding relationship between a latitude data difference value and an abscissa value, a longitude data difference value and a ordinate value, wherein the latitude data difference and the longitude data difference value are data difference values between the monitoring point and the coordinate origin, and the abscissa value and the ordinate value are coordinate values of the monitoring point in the first two-dimensional rectangular coordinate system.

5. The method according to claim 4, wherein the corresponding relationship between the GPS information of the monitoring point and the coordinate value of the monitoring point in the first two-dimensional rectangular coordinate system is calculated according to the following formula:

$$P_T=(P_{Tx},P_{Ty})=((N_T-N_0),(E_0-E_T)\times\cos(N_0/180\times\pi)),$$

where $P_T$ is the coordinate value of the monitoring point in the first two-dimensional rectangular coordinate system, $P_{Tx}$ is the abscissa value of the monitoring point in the first two-dimensional rectangular coordinate system, and $P_{Ty}$ is the ordinate value of the monitoring point in the first two-dimensional rectangular coordinate system, $N_0$ is the latitude data in the GPS information of the coordinate origin, and $E_0$ is the longitude data in the GPS information of the coordinate origin, and $N_T$ is the latitude data in the GPS information of the monitoring point, and $E_T$ is the longitude data in the GPS information of the monitoring point.

6. The method according to claim 2, wherein a step of acquiring the third conversion relationship between the PTZ coordinate information and the tracking equipment coordinate information before storing the conversion relationship between the GPS information and the PTZ coordinate information comprises:

establishing the second two-dimensional rectangular coordinate system, wherein directions of abscissa and ordinate axes of the second two-dimensional rectangular coordinate system is a direction, to which the tracking equipment points when a horizontal rotation angle difference of the tracking equipment is 90° respectively;

reading PTZ coordinate information of a monitoring point in a picture of the tracking equipment; and creating a corresponding relationship between the PTZ coordinate information of the monitoring point and a coordinate value of the monitoring point in the second two-dimensional rectangular coordinate system, so as to acquire the third conversion relationship.

7. The method according to claim 6, wherein the corresponding relationship between the PTZ coordinate information of the monitoring point and the coordinate value of the monitoring point in the second two-dimensional rectangular coordinate system is calculated according to the following formula:

$$Q_T=(Q_{Tx},Q_{Ty})=(1/\tan(\varphi_T/180\times\pi)\times\sin((\theta_T-74_y)/180\times\pi), 1/\tan(\varphi_T/180\times\pi)\times\cos((\theta_T-74_y)/180\times\pi)),$$

where $Q_T$ is the coordinate value of the monitoring point in the second two-dimensional rectangular coordinate system, $Q_{Tx}$ is an abscissa value of the monitoring point in the second two-dimensional rectangular coordinate system, and $Q_{Ty}$ is an ordinate value of the monitoring point in the second two-dimensional rectangular coordinate system, $\theta_T$ is a P parameter of the monitoring point,$\theta_y$), is a horizontal rotation angle of the tracking equipment when the tracking equipment points to the vertical axis of the second two-dimensional rectangular coordinate system, and $\varphi_T$ is a T parameter of the monitoring point.

8. The method according to claim 2, wherein a step of acquiring the second conversion relationship between the ground coordinate information and the tracking equipment coordinate information before storing the conversion relationship between the GPS information and the PTZ coordinate information comprises:
  reading ground coordinate information of at least two monitoring points in a picture of the tracking equipment in the first two-dimensional rectangular coordinate system;
  reading tracking equipment coordinate information of the at least two monitoring points in the second two-dimensional rectangular coordinate system; and
  creating a corresponding relationship between a coordinate value in the first two-dimensional rectangular coordinate system and a coordinate value in the second two-dimensional rectangular coordinate system to acquire the second conversion relationship;
  wherein the second conversion relationship is configured to represent a corresponding relationship between a coordinate value of a monitoring point in the first two-dimensional rectangular coordinate system and a coordinate value of the same monitoring point in the second two-dimensional rectangular coordinate system.

9. The method according to claim 8, wherein creating the corresponding relationship between the coordinate value in the first two-dimensional rectangular coordinate system and the coordinate value in the second two-dimensional rectangular coordinate system to acquire the second conversion relationship comprises:
  establishing a first column vector and second column vector based on a monitoring point respectively, according to the coordinate values of the monitoring point in the at least two monitoring points in the first two-dimensional rectangular coordinate system and the second two-dimensional rectangular coordinate system;
  creating a corresponding relationship between the first column vector and the second column vector, wherein the corresponding relationship comprises that: a result obtained by multiplying the first column vector by a scaling transformation coefficient, premultiplying a multiplication result by a rotation transformation matrix and adding a translation transformation vector to a premultiplication result is equal to the second column vector, or, a result obtained by multiplying the second column vector by the scaling transformation coefficient, premultiplying a multiplication result by the rotation transformation matrix and adding translation transformation vector to a premultiplication result is equal to the first column vector; and
  calculating a scaling coefficient, rotation coefficient and translation coefficient between the first two-dimensional rectangular coordinate system and the second two-dimensional rectangular coordinate system to obtain the second conversion relationship, wherein the scaling transformation coefficient is the scaling coefficient, a rotation angle in the rotation transformation matrix is the rotation coefficient, and two elements of a translation transformation column vector correspond to an abscissa translation coefficient and an ordinate translation coefficient.

10. The method according to claim 9, wherein the scaling coefficient, rotation coefficient and translation coefficient between the first two-dimensional rectangular coordinate system and the second two-dimensional rectangular coordinate system are calculated according to the following formula:

$$\alpha \begin{bmatrix} \cos\theta & -\sin\theta \\ \sin\theta & \cos\theta \end{bmatrix} \begin{bmatrix} P_{1x} \\ P_{1y} \end{bmatrix} + \begin{bmatrix} a \\ b \end{bmatrix} = \begin{bmatrix} Q_{1x} \\ Q_{1y} \end{bmatrix}, \text{ and}$$

$$\alpha \begin{bmatrix} \cos\theta & -\sin\theta \\ \sin\theta & \cos\theta \end{bmatrix} \begin{bmatrix} P_{2x} \\ P_{2y} \end{bmatrix} + \begin{bmatrix} a \\ b \end{bmatrix} = \begin{bmatrix} Q_{2x} \\ Q_{2y} \end{bmatrix},$$

where $\alpha$ is the scaling coefficient, $\theta$ is the rotation coefficient, a is the abscissa translation coefficient, b is the ordinate translation coefficient, $P_{1x}$, is an abscissa value of the first monitoring point in the at least two monitoring points in the first two-dimensional rectangular coordinate system, and $P_{1y}$ is an ordinate value of the first monitoring point in the at least two monitoring points in the first two-dimensional rectangular coordinate system, $Q_{1x}$ is an abscissa value of the first monitoring point in the second two-dimensional rectangular coordinate system, and $Q_{1y}$, is an ordinate value of the first monitoring point in the second two-dimensional rectangular coordinate system, $P_{2x}$ is an abscissa value of the second monitoring point in the at least two monitoring points in the first two-dimensional rectangular coordinate system, and $P_{2y}$ is an ordinate value of the second monitoring point in the at least two monitoring points in the first two-dimensional rectangular coordinate system, and $Q_{2x}$ is an abscissa value of the second monitoring point in the second two-dimensional rectangular coordinate system, and $Q_{2y}$ is an ordinate value of the second monitoring point in the second two-dimensional rectangular coordinate system.

11. The method according to claim 10, wherein, when the scaling transformation coefficient, the rotation transformation matrix and the translation transformation column vector are calculated by virtue of coordinate values of more than three points, the method for acquiring the scaling coefficient, rotation coefficient and translation coefficient between the first two-dimensional rectangular coordinate system and the second two-dimensional rectangular coordinate system further comprises: obtaining fitted values of the scaling coefficient, the rotation coefficient and the translation coefficient under a mean square error by a least square method.

12. The method according to claim 9, wherein, when the scaling transformation coefficient, the rotation transformation matrix and the translation transformation column vector are calculated by virtue of coordinate values of three or more monitoring points, acquiring the scaling coefficient, rotation coefficient and translation coefficient between the first two-dimensional rectangular coordinate system and the second two-dimensional rectangular coordinate system further comprises: obtaining fitted values of the scaling coefficient, the rotation coefficient and the translation coefficient under a mean square error by a least square method.

13. A monitoring terminal, configured to execute program codes for the steps provided by method for target tracking according to claim 1.

14. A non-transitory storage medium, configured to store program codes executed by the method for target tracking according to claim 1.

15. A device for target tracking, comprising:
  a memory;
  a processing device in communication with the memory and configured to execute instructions stored in the memory to:
  acquire Global Positioning System (GPS) information of a target object monitored by tracking equipment, wherein the target object is positioned within a monitoring range of the tracking equipment;

obtain Pan/Tilt/Zoom (PTZ) coordinate information corresponding to the GPS information of the target object according to a pre-stored conversion relationship between GPS information and PTZ coordinate information, wherein the pre-stored conversion relationship between the GPS information and the PTZ coordinate information is a mutual conversion relationship between GPS information and PTZ coordinate information of any point in a visual range of the tracking equipment; and regulate the tracking equipment according to the PTZ coordinate information of the target object to control the tracking equipment to monitor the target object.

16. The device according to claim 15, wherein, before obtaining the PTZ coordinate information, the processing device is further configured to execute the instructions to store the conversion relationship between the GPS information and the PTZ coordinate information, wherein the conversion relationship comprises:

a first conversion relationship between the GPS information and ground coordinate information, a second conversion relationship between the ground coordinate information and tracking equipment coordinate information and a third conversion relationship between the PTZ coordinate information and the tracking equipment coordinate information, wherein the ground coordinate information is a coordinate value in a first two-dimensional rectangular coordinate system, the tracking equipment coordinate information is a coordinate value in a second two-dimensional rectangular coordinate system, and the second two-dimensional rectangular coordinate system adopts an upright tube of the tracking equipment as a coordinate origin.

17. The device according to claim 16, wherein the processing device is further configured to execute the instructions to obtain the PTZ coordinate information by:

converting the currently acquired GPS information of the target object into ground coordinate information corresponding to the target object according to the first conversion relationship;

converting the ground coordinate information, obtained by conversion, corresponding to the target object into tracking equipment coordinate information corresponding to the target object according to the second conversion relationship; and converting the tracking equipment coordinate information, obtained by conversion, corresponding to the target object into the PTZ coordinate information corresponding to the target object according to the third conversion relationship.

18. The device according to claim 16, wherein, before storing the conversion relationship, the processing device is further configured to execute the instructions to acquire the first conversion relationship between the GPS information and the ground coordinate information by:

establishing a first two-dimensional rectangular coordinate system, wherein abscissa and ordinate axes of the first two-dimensional rectangular coordinate system point to any two directions in due east, due west, due south and due north respectively;

reading GPS information of a coordinate origin of the first two-dimensional rectangular coordinate system, and read GPS information of a monitoring point in a monitoring picture of the tracking equipment, the GPS information comprising: latitude data and longitude data; and creating a corresponding relationship between the GPS information of the monitoring point and a coordinate value of the monitoring point in the first two-dimensional rectangular coordinate system to acquire the first conversion relationship, wherein the first conversion relationship is configured to represent a corresponding relationship between a latitude data difference value and an abscissa value, a longitude data difference value and a ordinate value, wherein the latitude data difference and the longitude data difference value are data difference values between the monitoring point and the coordinate origin, and the abscissa value and the ordinate value are coordinate values of the monitoring point in the first two-dimensional rectangular coordinate system.

19. The device according to claim 16, wherein, before storing the conversion relationship, the processing device is further configured to execute the instructions to acquire the third conversion relationship between the PTZ coordinate information and the tracking equipment information by:

establishing a second two-dimensional rectangular coordinate system, wherein the second two-dimensional rectangular coordinate system takes the tracking equipment as an origin, directions of abscissa and ordinate axes of the second two-dimensional rectangular coordinate system is a direction, to which the tracking equipment points when a horizontal rotation angle difference of the tracking equipment is 90° respectively;

reading PTZ coordinate information of a monitoring point in a picture of the tracking equipment; and creating a corresponding relationship between the PTZ coordinate information of the monitoring point and a coordinate value of the monitoring point in the second two-dimensional rectangular coordinate system, so as to acquire the third conversion relationship.

20. The device according to claim 16, wherein, before storing the conversion relationship, the processing device is further configured to execute the instructions to acquire the second conversion relationship between the ground coordinate information and the tracking equipment information by:

reading ground coordinate information of at least two monitoring points in a picture of the tracking equipment in the first two-dimensional rectangular coordinate system;

reading tracking equipment coordinate information of the at least two monitoring points in the second two-dimensional rectangular coordinate system; and creating a corresponding relationship between a coordinate value in the first two-dimensional rectangular coordinate system and a coordinate value in the second two-dimensional rectangular coordinate system to acquire the second conversion relationship, wherein the second conversion relationship is configured to represent a corresponding relationship between a coordinate value of a monitoring point in the first two-dimensional rectangular coordinate system and a coordinate value of the same monitoring point in the second two-dimensional rectangular coordinate system.

21. A system for target tracking, comprising:

a Global Positioning System (GPS) mechanism, configured to acquire GPS information of a target object monitored by a tracking equipment, wherein the target object is positioned within a monitoring range of the tracking equipment;

a processor, configured to obtain Pan/Tilt/Zoom (PTZ) coordinate information corresponding to the GPS information of the target object according to a pre-stored conversion relationship between GPS information and PTZ coordinate information, wherein the pre-stored conversion relationship between the GPS information and the PTZ coordinate information is a mutual conversion relationship between GPS information and PTZ coordinate information of any point in a visual range of the tracking equipment; and the tracking equipment, configured to monitor the target object according to the PTZ coordinate information of the target object.

* * * * *